United States Patent
Lam et al.

(10) Patent No.: US 10,712,485 B1
(45) Date of Patent: Jul. 14, 2020

(54) COMPOSITE OPTICAL COATING ON A CURVED OPTICAL SURFACE

(71) Applicant: Facebook Technologies, LLC, Menlo Park, CA (US)

(72) Inventors: Wai Sze Tiffany Lam, Redmond, WA (US); Lu Lu, Seattle, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 15/892,870

(22) Filed: Feb. 9, 2018

Related U.S. Application Data

(60) Provisional application No. 62/464,990, filed on Feb. 28, 2017.

(51) Int. Cl.
*B05D 5/06* (2006.01)
*G02B 5/30* (2006.01)
*B05D 3/06* (2006.01)

(52) U.S. Cl.
CPC .......... *G02B 5/3016* (2013.01); *B05D 3/06* (2013.01); *B05D 5/061* (2013.01)

(58) Field of Classification Search
CPC .......... B05D 3/06; B05D 3/063; B05D 3/065; B05D 3/067; B05D 5/061; G02B 1/12; G02B 5/3016
USPC .............. 427/553, 554, 555, 557, 558, 559, 427/162–165, 168, 169
See application file for complete search history.

(56) References Cited

U.S. PATENT DOCUMENTS

| | | | | |
|---|---|---|---|---|
| 4,572,616 A * | 2/1986 | Kowel | .................. | G02B 26/06 349/200 |
| 6,496,239 B2 * | 12/2002 | Seiberle | ............... | G02B 5/3016 349/24 |
| 8,358,400 B2 * | 1/2013 | Escuti | ................... | G02F 1/1337 349/129 |
| 10,197,715 B1 * | 2/2019 | Tabirian | ............... | G02B 5/1866 |
| 10,310,273 B2 * | 6/2019 | Calm | ................. | G02B 27/0189 |
| 10,502,963 B1 * | 12/2019 | Noble | ............... | G02B 27/0172 |
| 10,520,772 B1 * | 12/2019 | Lu | ...................... | G02B 27/0172 |
| 10,591,739 B2 * | 3/2020 | Calm | .................... | G02F 1/1393 |
| 2006/0274231 A1 * | 12/2006 | Kwon | ............... | G02F 1/133512 349/106 |

(Continued)

FOREIGN PATENT DOCUMENTS

| JP | 2009-086191 A | * | 4/2009 | .......... G02F 1/1337 |
|---|---|---|---|---|
| JP | 5617153 B2 | * | 9/2014 | .......... G02F 1/1337 |

OTHER PUBLICATIONS

Lerner et al., editors; Encyclopedia of Physics, 2nd edition; "Moment of inertia" by Tangherlini; VCH publishers, Inc., New York; 1991 (no month), excerpt pp. 767-770.*

(Continued)

*Primary Examiner* — Marianne L Padgett
(74) *Attorney, Agent, or Firm* — Fenwick & West LLP

(57) ABSTRACT

A manufacturing system for controlling an optical axis of a birefringent material includes an illumination system. The illumination system illuminates the birefringent material that is formed on a curved optical surface with polarized light. The polarized light forms a pattern on the photoalignment material deposited on the curved optical surface. In some configurations, the manufacturing system applies a liquid crystal layer on the formed pattern. The liquid crystal layer includes a liquid crystal director whose orientation is determined by the pattern formed.

7 Claims, 9 Drawing Sheets

(56) References Cited

U.S. PATENT DOCUMENTS

| | | | | |
|---|---|---|---|---|
| 2008/0180630 | A1* | 7/2008 | Clarke | G02C 7/083 349/201 |
| 2009/0096981 | A1* | 4/2009 | Clarke | G02C 7/02 349/200 |
| 2009/0244411 | A1* | 10/2009 | Takane | G02B 5/1828 349/1 |
| 2013/0027655 | A1* | 1/2013 | Blum | G02C 7/083 349/193 |
| 2014/0092373 | A1* | 4/2014 | Tabirian | G02B 5/3083 355/71 |
| 2014/0327875 | A1* | 11/2014 | Blum | A61F 2/1618 351/159.03 |
| 2015/0293371 | A1* | 10/2015 | Song | G02B 27/4233 427/555 |
| 2016/0033698 | A1* | 2/2016 | Escuti | G02B 5/3016 349/186 |
| 2016/0339473 | A1* | 11/2016 | Okawa | G02F 1/133753 |
| 2016/0357038 | A1* | 12/2016 | Zhao | G02F 1/133514 |
| 2017/0255015 | A1* | 9/2017 | Geng | G02B 6/0008 |
| 2018/0074340 | A1* | 3/2018 | Robbins | G02B 27/0081 |
| 2018/0120579 | A1* | 5/2018 | Gollier | G02B 27/286 |
| 2018/0284459 | A1* | 10/2018 | Calm | G02B 6/08 |
| 2018/0284464 | A1* | 10/2018 | Lu | G02B 27/14 |
| 2019/0114950 | A1* | 4/2019 | Calm | G02B 27/0081 |
| 2019/0317450 | A1* | 10/2019 | Yaroshchuk | G03H 1/02 |

OTHER PUBLICATIONS

Sarkissian et al.; "Longitudinally modulated nematic bandgap structure"; Journal optical Society of America B; vol. 23, No. 8; Aug. 2016; pp. 1712-1717.*

Broer, D.J. et al., "In-Situ Photopolymerization of Oriented Liquid-Crystalline Acrylates, $3^{a)}$," Makromol. Chem. 1989, pp. 2255-2268, vol. 190.

Herrera-Fernandez, J. M. et al., "Design of Superachromatic Quarter-Wave Retarders in a Broad Spectral Range," Applied Optics, Nov. 20, 2015, pp. 9758-9762, vol. 54, No. 33.

Ma, D. et al., "Tailoring Freeform Illumination Optics in a Double-Pole Coordinate System," Applied Optics, Mar. 20, 2015, pp. 2395-2399, vol. 54, No. 9.

Pancharatnam, S., "Achromatic Combinations of Birefringent Plates," Supplement to the Proceedings of the Indian Academy of Sciences, 1955, 9 pages, vol. XLI, Section A.

Yaroshchuk, O. et al., "Photoalignment of Liquid Crystals: Basics and Current Trends," Journal of Materials Chemistry, 2012, pp. 286-300, vol. 22.

Young, G. et al., "A Review of Skew Aberration, the Intrinsic Polarization Aberration in High NA Optical Systems," Proc. of SPIE-OSA, International Optical Design Conference 2014, M. Figueiro et al. (eds.), 7 pages, vol. 9293.

* cited by examiner

First Pattern 210

$$\left(0, -\frac{z}{\sqrt{y^2+z^2}}, \frac{y}{\sqrt{y^2+z^2}}\right)$$ Co-ordinate system 215

Second Pattern 220

$$\left(-\frac{xy}{\sqrt{x^2+z^2}}, \sqrt{x^2+z^2}, -\frac{yz}{\sqrt{x^2+z^2}}\right)$$ Co-ordinate system 225

Third Pattern 230

$$\left(-\frac{xy}{1+z}, 1-\frac{y^2}{1+z}, -y\right)$$ Co-ordinate system 235

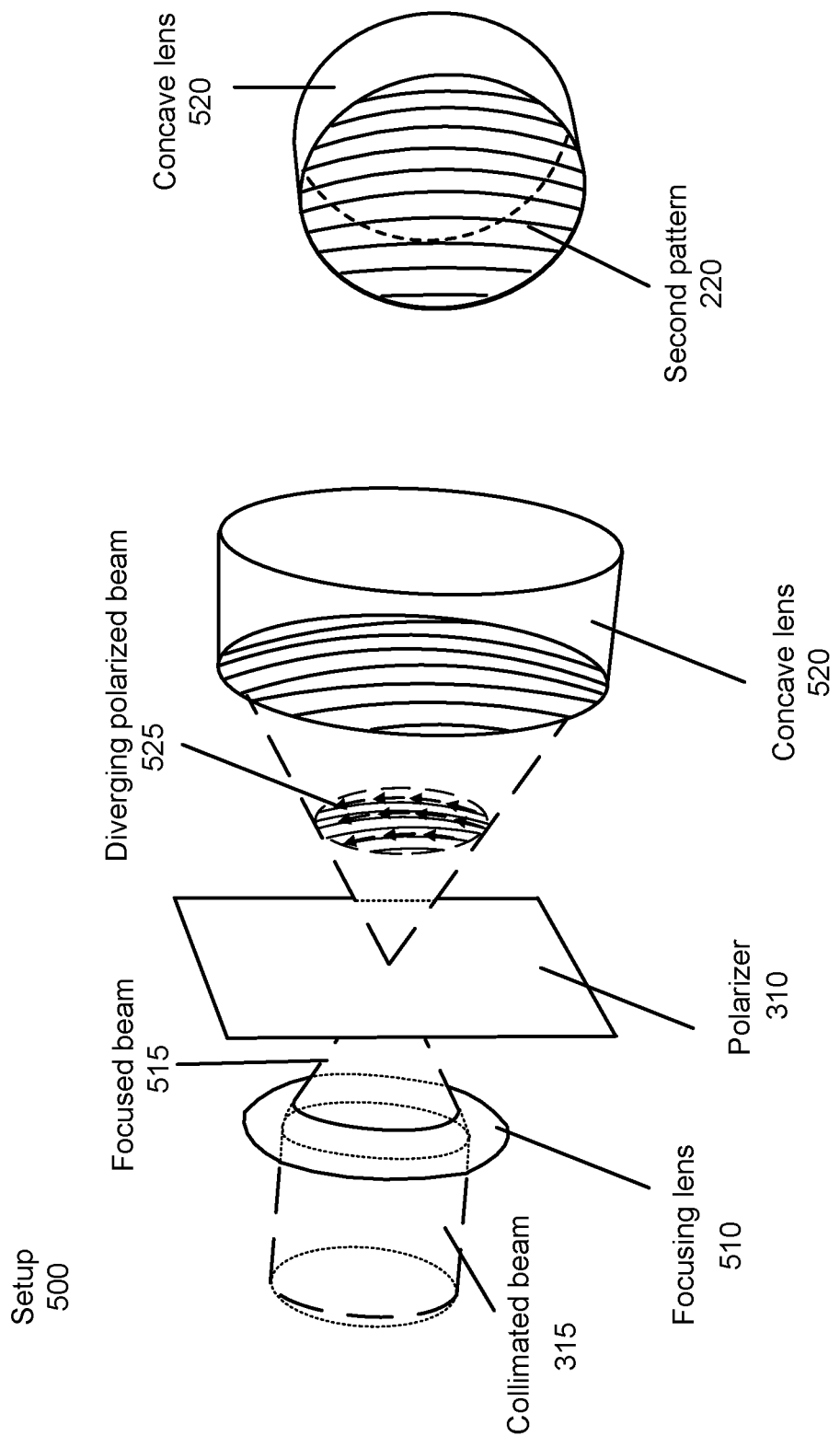

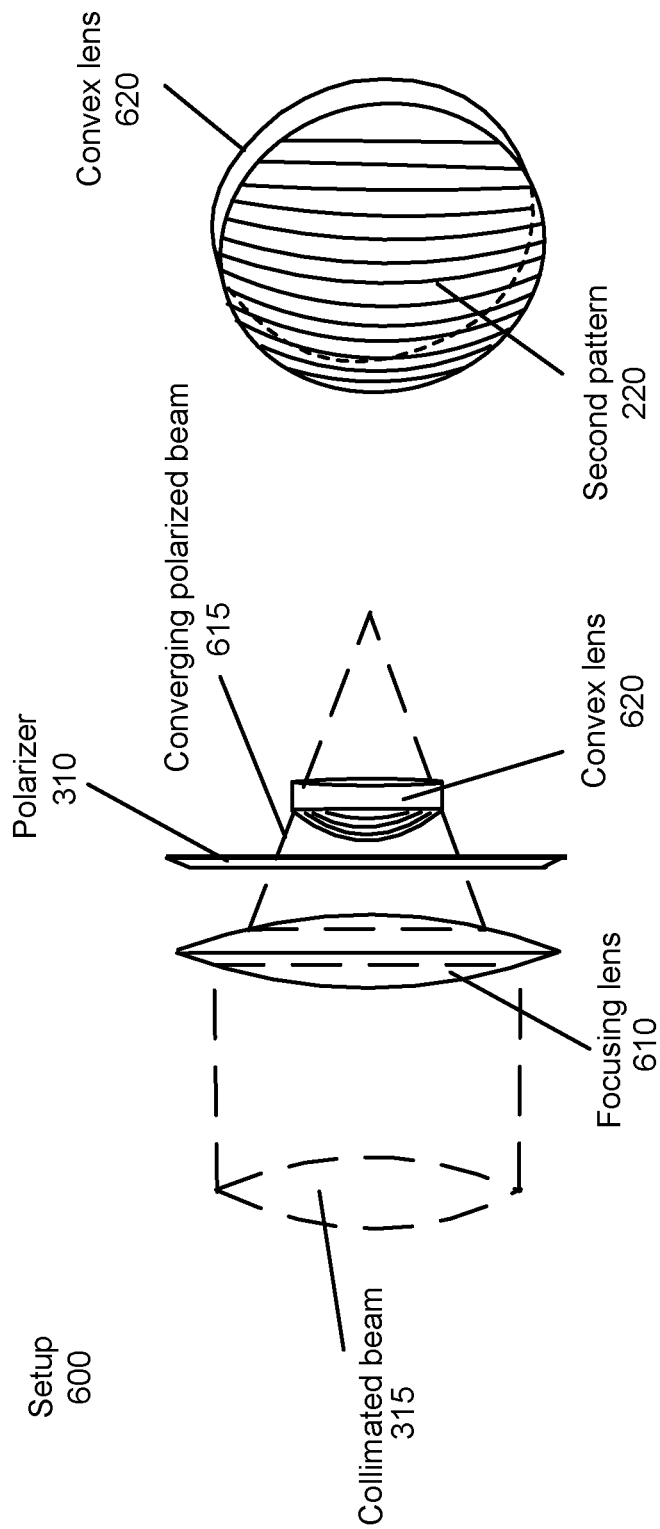

COMPOSITE OPTICAL COATING ON A CURVED OPTICAL SURFACE

CROSS REFERENCE TO RELATED APPLICATIONS

This application claims the benefit of U.S. Provisional Application No. 62/464,990, filed Feb. 28, 2017, which is incorporated by reference in its entirety.

BACKGROUND

The disclosure relates generally to controlling the optical axis of a birefringent material, and more specifically to generating composite optical coatings with linearly polarized patterns on a curved optical surface.

In head-mounted displays (HMDs), folded optical systems may be used to significantly reduce the thickness and weight of the optical system inside the HMDs by means of a folded optical path. Such optical systems may include a quarter wave-plate compatible with a broad band of optical wavelength (e.g. 450 nm to 650 nm) for converting a linearly polarized light to a circularly polarized light. Conventional approaches such as Quarter-Half-Quarter design are currently used to form a quarter-wave plate on a flat optical surface. However, for manufacturing pancake lenses with a highly curved optical surface (e.g. radius of curvature of ~42 mm), methods currently used to form a quarter-wave plate on a curved optical surface are mostly based on lamination on curved optical surfaces. Among several other limitations, lamination based approaches to form a quarter-wave plate on a curved optical surface often induce artifacts (e.g. wrinkles and bubbles) during heating and stretching that result in an increased scattering of light, and increased difficulty to control a spatial orientation of the optical axis across the quarter-wave plate created on a curved optical surface.

SUMMARY

Embodiments relate to a manufacturing system for controlling an optical axis of a photoalignment material. The manufacturing system includes an illumination system. The illumination system illuminates the photoalignment material that is formed on a curved optical surface with polarized light. The polarized light forms a pattern on the photoalignment material deposited on the curved optical surface. In some configurations, the manufacturing system applies a liquid crystal layer on the formed pattern. The liquid crystal layer includes a liquid crystal director whose orientation is determined by the pattern formed.

In some configurations, the manufacturing system includes a focusing lens assembly adjusting a focal depth of the light generated by the illumination source and transmitting a focused light to the polarizer. In alternate configurations, the manufacturing system includes a focusing lens assembly adjusting a focal depth of the polarized light and transmitting a focused beam of the polarized light forming the pattern on the photoalignment material deposited on the curved optical surface.

Embodiments also relate to a method for controlling an optical axis of a photoalignment material. The manufacturing system generates a linear polarized light using an illumination system. The manufacturing system illuminates a photoalignment material deposited on a curved optical surface with the linear polarized light forming a pattern in the photoalignment material on the curved optical surface. The manufacturing system applies a liquid crystal layer to the pattern on the curved optical surface.

In a different embodiment, the manufacturing system deposits a photoalignment material on a curved optical surface. The manufacturing system generates a linear polarized light using an illumination system. The manufacturing system illuminates the photoalignment material deposited on a curved optical surface with the linear polarized light that form a pattern in the photoalignment material on the curved optical surface.

BRIEF DESCRIPTION OF THE DRAWINGS

FIG. 5A is a setup of an illumination system for generating a portion of the second pattern of FIG. 2B on a concave lens, in accordance with one or more embodiments.

FIG. 5B is an illustration of the second pattern of FIG. 2B generated on a concave lens, in accordance with one or more embodiments.

FIG. 6A is a setup of an illumination system for generating a portion of the second pattern of FIG. 2B on a convex lens, in accordance with one or more embodiments.

FIG. 6B is an illustration of the second pattern of FIG. 2B generated on a convex lens, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A manufacturing system controls an optical axis of a birefringent material (e.g. a photoalignment material, a liquid crystal reactive monomer, etc.). The manufacturing system includes an illumination system that illuminates the birefringent material that is formed on a curved optical surface with polarized light. The polarized light forms a pattern on the photoalignment material deposited on the curved optical surface. In some configurations, the manufacturing system applies a liquid crystal layer on the formed pattern. The liquid crystal layer includes a liquid crystal director whose orientation is determined by the pattern formed.

Note that the described system and method for controlling the optical axis is not limited to make a quarter-wave plate on a curved pancake lens inside HMDs. In alternate embodiments, the manufacturing system and the corresponding method may be applied to any optical coating using a photo-alignment approach to control the optical axis of a birefringent material used to make at least one of a quarter-wave plate, a half wave-plate, a polarizer, and a photochromic polarizer.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 1:
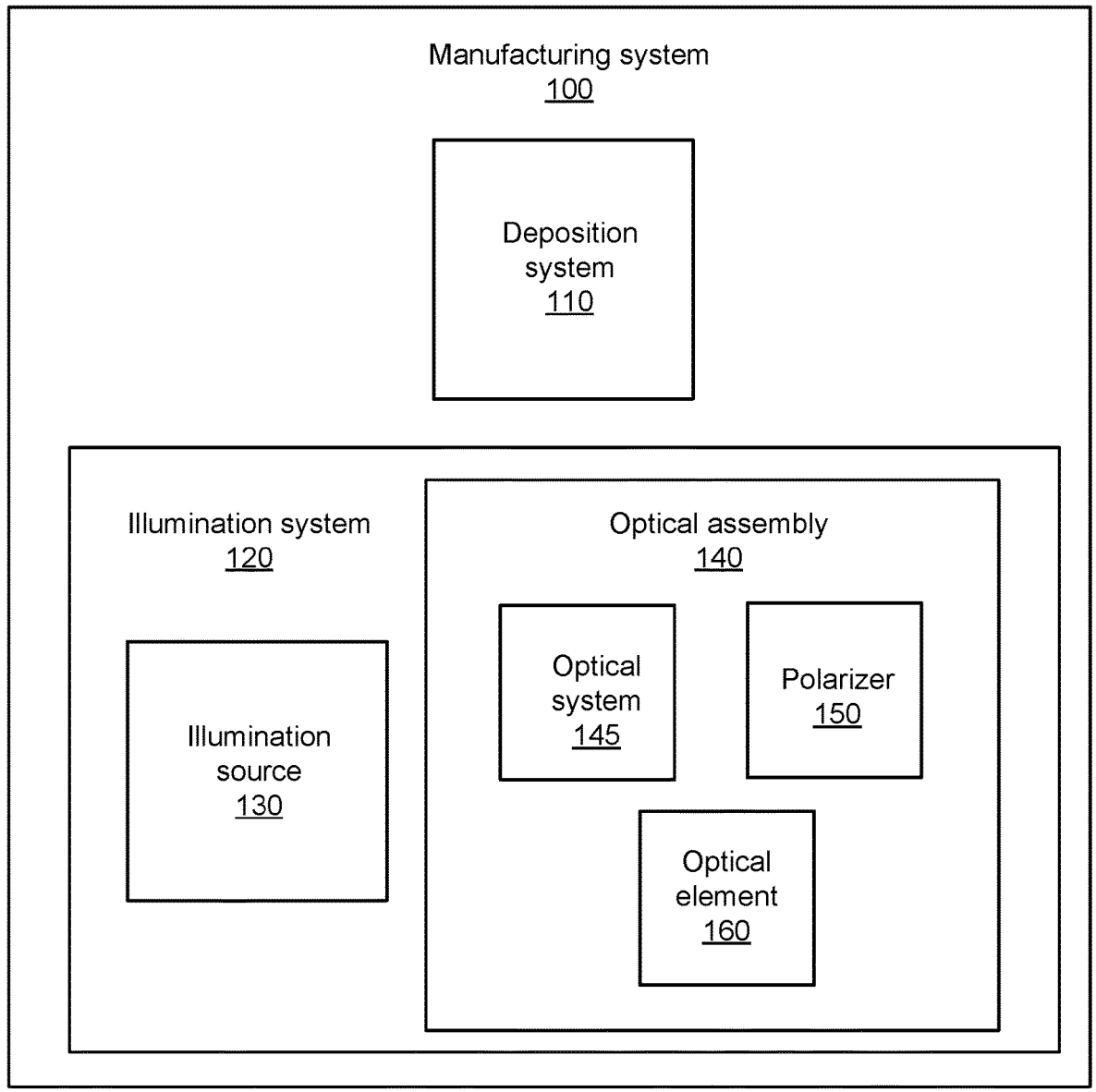
FIG. 1 is a block diagram of a manufacturing system for forming an optical coating on an optical element, in accordance with one or more embodiments.

FIG. 1 is a block diagram of a manufacturing system 100 for forming an optical coating on an optical element, in accordance with one or more embodiments. The manufacturing system 100 includes a deposition system 110, an illumination system 120, or some combination thereof. The manufacturing system 100 may be similar to a system of fabricating devices used to form an integrated circuit, and may include such components as an etching component, a thin film manufacturing component, an oxidation component, and so on. In some embodiments, the manufacturing system 100 includes a controller (not shown here) that controls each system in the manufacturing system 100.

The deposition system 110 is a system that adds one or more thin films of materials on a substrate. The deposition system 110 adds the thin films of materials on the substrate based on a spin coating, an inkjet coating, a spray coating, a dip coating, a physical vapor deposition, a chemical vapor deposition, an atomic layer deposition, or some combination thereof, as described below in conjunction with FIG. 3A. In some configurations, the deposition system 110 deposits a photoalignment material on a spherically curved optical surface. For example, the deposition system 110 deposits one or more layers of photo-alignment materials, azobenzene liquid crystals, azobenzene monomers, non-azobenzene reactive mesogens, chiral azobenzene dyes, fast azobenzene liquid crystals, synthetic intermediates, SSQ derivatives, liquid crystal reactive monomers (e.g. RM-257 and RM-82) or some combination thereof.

The illumination system 120 is a system that generates light, conditions the generated light, and illuminates a birefringent material (e.g., photoalignment material) with a collimated beam of light. The illumination system 120 includes, among several other components, an illumination source 130, and an optical assembly 140. In some configurations, the illumination system 120 includes a light source, a reflecting optics, and a refracting optics used to collect, collimate, filter, and focus the light generated by the light source. In some embodiments, the illumination system 120 illuminates a spherically curved surface with a polarized light in order to form a pattern on a photoalignment material deposited on the spherically curved surface. In some configurations, a liquid crystal layer applied to the pattern formed on the photoalignment material includes a liquid crystal director whose orientation is determined by the pattern.

The illumination source 130 is a system that generates a beam of light corresponding to a target value of an illumination intensity. The illumination source 130 generates the beam of light within an optical band of wavelength forming a pattern on a photoalignment material deposited on a curved surface. In one example, the illumination source 130 is a mercury source with an illumination intensity in the range of 2 to 50 mW/cm$^2$, and the exposure time of the illumination source 130 is in the range of 1 nanosecond to few hundred seconds. In another example, the illumination source 130 is a light emitting diode generating a beam of light within an optical band of wavelength that matches with the absorption spectrum of the photoalignment material.

The optical assembly 140 is a system that redirects a beam of light generated by the illumination source 130. The optical assembly 140 includes an optical system 145, a polarizer 150, and an optical element 160. In some configurations, the optical assembly 140 may include a set of reflective and/or refractive optics directing a collimated beam of light from the illumination source 130.

The optical system 145 is a system that receives the beam of light generated by the illumination source 130 and directs a conditioned beam of light. The optical system 145 includes, among several other components, a conditioning lens assembly, a focusing lens assembly, one or more concave lenses, one or more convex lenses, etc. The conditioning lens assembly conditions light incident from the illumination source 130. The conditioning lens assembly includes one or more optical elements that condition the incident light. Conditioning light may include, e.g., collimating, error correction, beam adjustment (e.g., expansion contraction), beam direction, or some combination thereof. The focusing lens assembly adjusts a focal depth of incident light. The focusing lens assembly includes one or more optical components (e.g. a focusing lens) that focus the collimated beam of light from the illumination source 130.

The focusing lens assembly includes one or more focusing lenses. In some embodiments, the optical components include lenses, mirrors, apertures, gratings, or some combination thereof.

The polarizer 150 is an optical element configured to block linearly polarized light having a first polarization. (e.g., referred to as a blocking direction). The polarizer 150 transmits linearly polarized light having a second polarization (e.g., referred to as a transmission direction) that is orthogonal to the first polarization. The polarizer 150 transmits a polarized light toward a photoalignment material deposited on a curved optical surface, as described below in conjunction with FIG. 3A. The polarizer 150 includes different types of polarizers, including, but not restricted to, a wire grid polarizer, a dichroic polarizer, a crystal polarizer, etc.

The optical element 160 is an object with a curved optical surface. The optical element 160 has a freeform surface. The manufacturing system 100 deposits on the optical element 160 a photoalignment material that is patterned when exposed to a polarized light. The optical element 160 has a curved optical surface including at least one of: a spherically curved optical surface, a cylindrically curved optical surface, or some combination thereof. The deposition system 110 deposits a photoalignment material on the optical element 160 and the illumination system 120 forms a pattern on the photoalignment material deposited on the optical element 160. The optical element 160 includes at least one of: a concave lens, a convex lens, a concave mirror, a convex mirror, etc. In some configurations, a liquid crystal layer is then applied to the pattern formed on the optical element 160. The liquid crystal layer includes a liquid crystal director whose orientation is determined by the pattern formed on the optical element 160.

In a first embodiment, described below in conjunction with FIG. 5A, the focusing lens assembly adjusts a focal depth of the light generated by the illumination source 130 and transmit a focused light to the polarizer 150 that polarizes the focused light, and the polarized focused light transitions to a diverging polarized beam after a focal point of the focusing lens assembly, and the diverging polarized beam forms a pattern on the photoalignment material deposited on the curved optical surface of the optical element 160 that is concave. In a second embodiment, described below in conjunction with FIG. 6A, the focusing lens assembly adjusts a focal depth of the light generated by the illumination source 130 and transmit a focused light to the polarizer 150 that polarizes the focused light, and the polarized focused light is a converging polarized beam that forms a pattern on the photoalignment material deposited on the curved optical surface of the optical element 160 that is convex. In a third embodiment, described below in conjunction with FIG. 7A, the focusing lens assembly adjusts a focal depth of the polarized light and transmit a focused polarized light, and the polarized focused light transitions to a diverging polarized beam after a focal point of the focusing lens assembly, and the diverging polarized beam forms a pattern on the photoalignment material deposited on the curved optical surface of the optical element 160 that is concave. In a fourth embodiment, described below in conjunction with FIG. 8A, the focusing lens assembly adjusts a focal depth of the polarized light and transmit a focused polarized light, and the polarized focused light is a converging polarized beam that forms a pattern on the photoalignment material deposited on the curved optical surface of the optical element 160 that is convex.

Figure 2A:
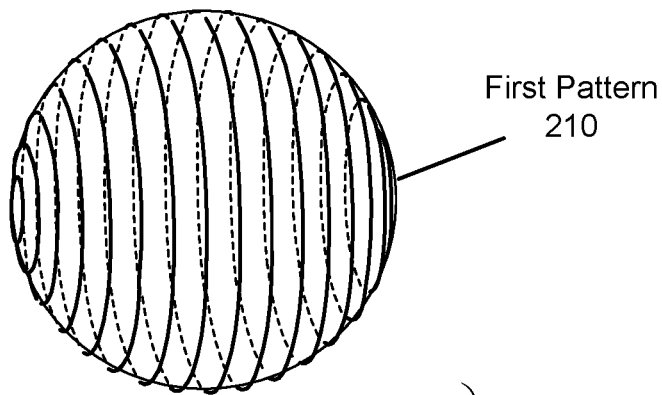
FIG. 2A is an illustration of a first pattern created using the manufacturing system of FIG. 1, in accordance with one or more embodiments.

FIG. 2A is an illustration of a first pattern 210 created using the manufacturing system 100 of FIG. 1, in accordance with one or more embodiments. A portion of the first pattern 210 may be formed on a curved optical surface using the manufacturing system 100. The first pattern 210 is an optical pattern formed by the manufacturing system 100 on a birefringent material. For example, the birefringent material can be a photoalignment material, a liquid crystal reactive monomer, one or more layers of liquid crystal polymers, or some combination thereof. The first pattern 210 is a three-dimensional (e.g. x, y, and z), spatially varying optical pattern with a plurality of latitudes. The first pattern 210 is associated with a Cartesian coordinate system 215 as shown in FIG. 2A. The first pattern 210 may be described as a spherical structure without any poles and the spherical structure is rotated by 90 degrees.

Figure 2B:
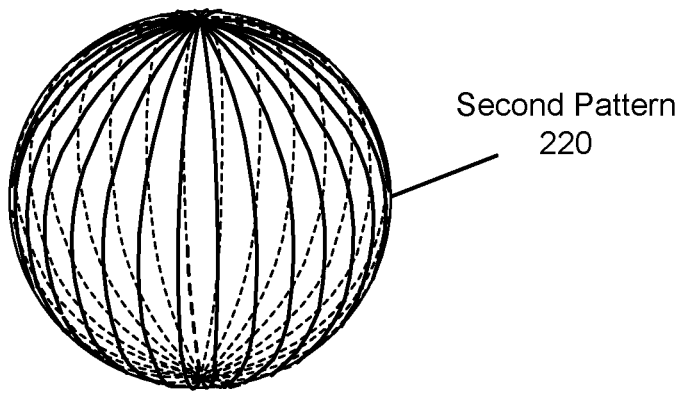
FIG. 2B is an illustration of a second pattern using the manufacturing system of FIG. 1, in accordance with one or more embodiments.

FIG. 2B is an illustration of a second pattern 220 created using the manufacturing system of FIG. 1, in accordance with one or more embodiments. A portion of the second pattern 220 may be formed on a curved optical surface using the manufacturing system 100. The second pattern 220 is an optical pattern formed by the manufacturing system 100 on a birefringent material. The second pattern 220 is a three-dimensional (e.g. x, y, and z), spatially varying optical pattern with a plurality of longitudes. The second pattern 220 is associated with a Cartesian coordinate system 225 as shown in FIG. 2B. The second pattern 220 may be described as a spherical structure with a plurality of longitudes, a first pole, and a second pole located diametrically opposite to the first pole, resulting from a converging beam of light passing through a linear polarizer. Note that the second pattern 220 has an orientation corresponding to the plurality of longitudes on the spherical structure and two poles, whereas the first pattern 210 has an orientation corresponding to a plurality of latitudes rotated by 90 degrees without any poles.

Figure 2C:
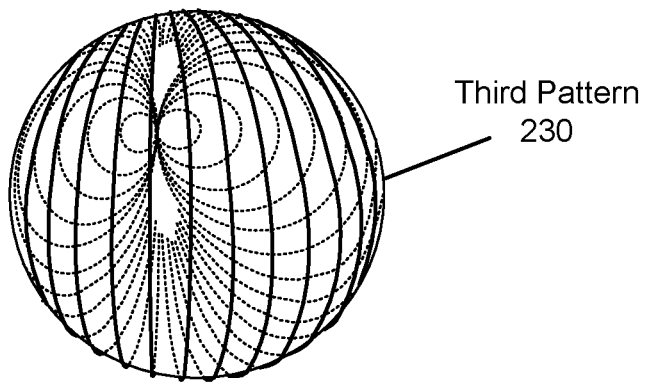
FIG. 2C is an illustration of a third pattern created using the manufacturing system of FIG. 1, in accordance with one or more embodiments.

FIG. 2C is an illustration of a third pattern 230 created using the manufacturing system of FIG. 1, in accordance with one or more embodiments. A portion of the third pattern 230 may be formed on a curved optical surface using the manufacturing system 100. The third pattern 230 is an optical pattern formed by the manufacturing system 100 on a birefringent material. The third pattern 230 is a three-dimensional (e.g. x, y, and z), spatially varying optical pattern with a plurality of latitudes and longitudes. The third pattern 230 is associated with a double-pole coordinate system 235 as shown in FIG. 2C. The third pattern 230 may be described as a spherical structure with a plurality of latitudes, a plurality of longitudes, a first pole, and a second pole located adjacent to the first pole, formed by a polarized light exiting a focusing lens. Note that the third pattern 230 has a different location of the first pole and the second pole on the spherical structure when compared to the first pattern 210 and the second pattern 220.

Figure 3B:
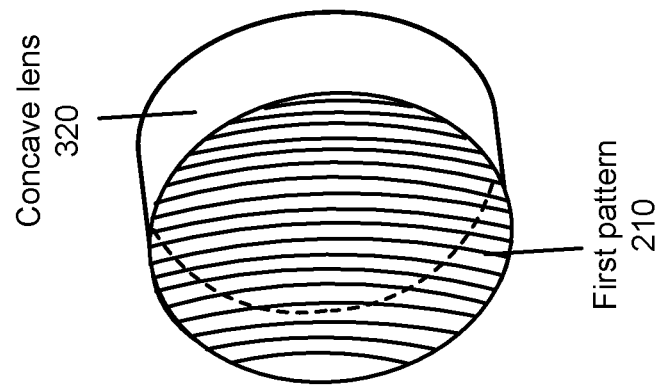
FIG. 3B is an illustration of the first pattern of FIG. 2A generated on a concave lens, in accordance with one or more embodiments.
Figure 3A:
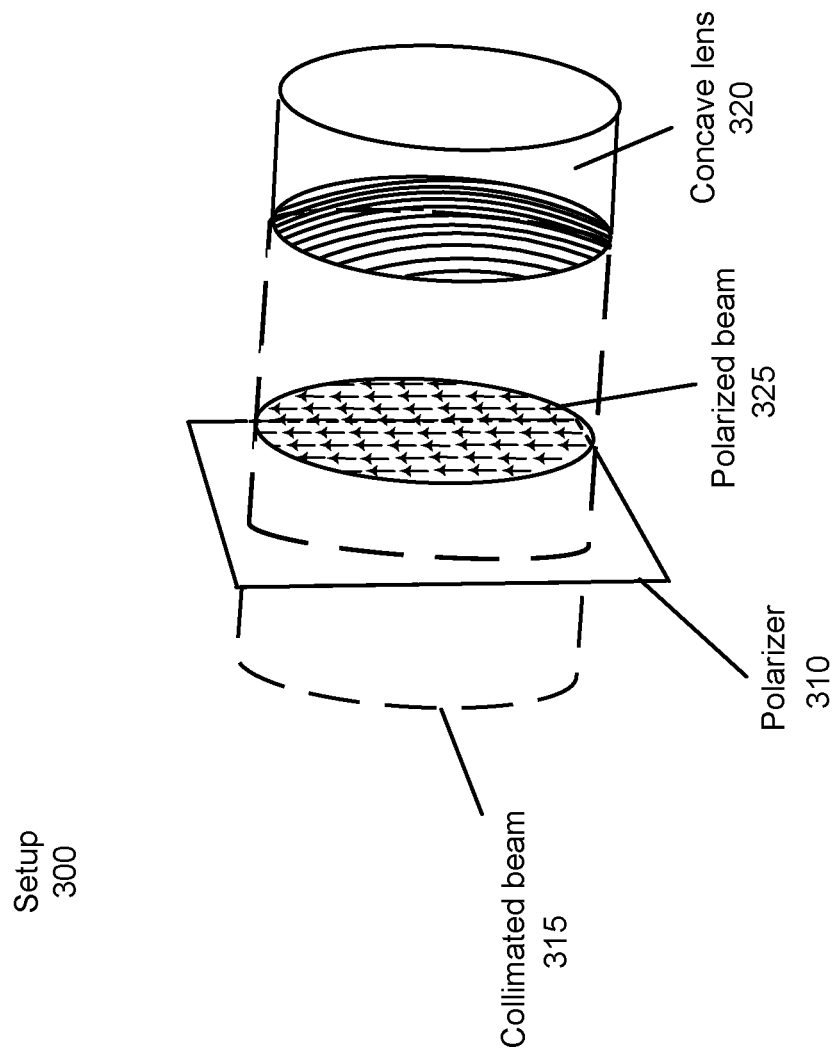
FIG. 3A is a setup of an illumination system for generating a portion of the first pattern of FIG. 2A on a concave lens, in accordance with one or more embodiments.

FIG. 3A is a setup 300 of an illumination system (e.g., the illumination system 120) for generating a portion of the first pattern of FIG. 2A on a concave lens, in accordance with one or more embodiments. The setup 300 is an arrangement for illuminating a birefringent material deposited on a curved optical surface (e.g. a spherically curved surface, a cylindrically curved surface, etc.) with a linear polarized light in order to form a pattern in the birefringent material on the curved optical surface. The setup 300 includes, among several other components, a polarizer 310 and a concave lens 320. The polarizer 310 is an embodiment of the polarizer 150 of FIG. 1. The concave lens 320 is an embodiment of the optical system 140 of FIG. 1.

As shown in FIG. 3A, the polarizer 310 receives a collimated beam 315 of light from the optical system 145. The polarizer 310 linearly polarizes the collimated beam 315 to form a polarized beam 325. The polarizer 310 transmits the polarized beam 325 toward the concave lens 320 to form the first pattern 210 on a photoalignment material deposited on the concave lens 320.

In some configurations, a liquid crystal layer is then applied, such as spin-coat, to the first pattern 210 formed on the photoalignment material. The liquid crystal layer has a liquid crystal director whose orientation is determined by the first pattern 210. The liquid crystal director is an axis along which rod-like liquid crystals in the liquid crystal layer are roughly aligned according to their moments of inertia. The setup 300 forms an optical coating on the spherically curved optical surface of the concave lens 320 by applying the liquid crystal layer on a portion of the first pattern 210 formed on the concave lens 320.

FIG. 3B is an illustration of the first pattern 210 of FIG. 2A generated on the concave lens 320, in accordance with one or more embodiments. The first pattern 210 formed on the concave lens 320 may be described as a hemispherical structure formed by the alignment of the liquid crystal directors. Note that the first pattern 210 is formed by aligning the liquid crystal directors to a target orientation by a combination of the illumination source 130 and the polarizer 310. The setup 300 forms an optical coating on the concave lens 320 by creating a portion of the first pattern 210 on the concave lens 320. Note that FIG. 3B shows the setup 300 forming a single optical coating on the concave lens 320 just as an example. In alternate configurations, the setup 300 repeats the formation of the optical coating on the concave lens 320 in a recursive fashion to form a composite optical coating with a plurality of optical layers. Each optical layer in the optical coating may form a portion of the first pattern 210. The composite optical coating includes one or more optical layers with the liquid crystal directors aligned to a first orientation and one or more optical layers with the liquid crystal directors aligned to a second orientation. In some configurations, each optical layer of the composite optical coating may have the liquid crystal directors aligned to a single orientation.

Figure 4B:
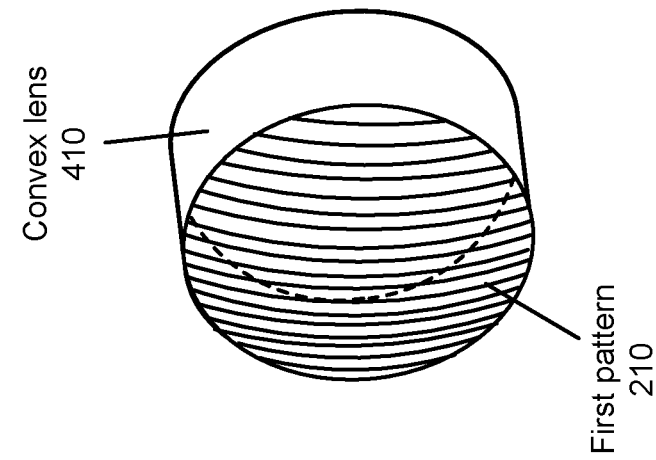
FIG. 4B is an illustration of the first pattern of FIG. 2A generated on a convex lens, in accordance with one or more embodiments.
Figure 4A:
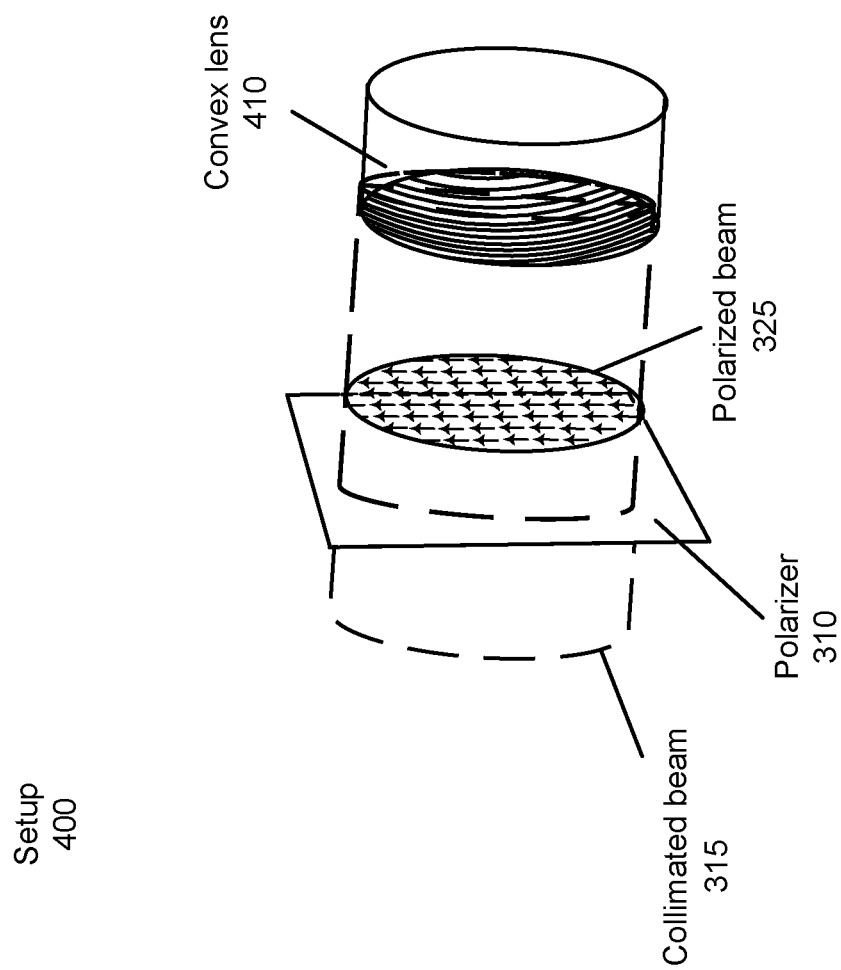
FIG. 4A is a setup of an illumination system for generating a portion of the first pattern of FIG. 2A on a convex lens, in accordance with one or more embodiments.

FIG. 4A is a setup 400 of an illumination system (e.g., the illumination system 120) for generating a portion of the first pattern 210 of FIG. 2A on a convex lens, in accordance with one or more embodiments. The setup 400 is an arrangement for illuminating a birefringent material deposited on a curved optical surface with a linear polarized light in order to form a pattern in the birefringent material on the curved optical surface. The setup 400 includes, among several other components, the polarizer 310 and a convex lens 410. The convex lens 410 is an embodiment of the optical system 140 of FIG. 1.

As shown in FIG. 4A, the polarizer 310 receives a collimated beam 315 of light from the optical system 145. The polarizer 310 transmits a polarized beam 325 toward the convex lens 410 to form the first pattern 210 on a photoalignment material deposited on the convex lens 410. In some configurations, a liquid crystal layer applied to the first pattern 210 formed on the photoalignment material deposited on the convex lens 410 includes a liquid crystal director whose orientation is determined by the first pattern 210. The setup 400 forms an optical coating on the spherically curved optical surface of the convex lens 410 by applying the liquid crystal layer on the first pattern 210 formed on the convex lens 410.

FIG. 4B is an illustration of the first pattern 210 of FIG. 2A generated on the convex lens 410, in accordance with one or more embodiments. The first pattern 210 generated on the convex lens 410 may be described as a hemispherical structure formed by the alignment of the liquid crystal directors. The setup 400 forms an optical coating on the convex lens 410 by creating a portion of the first pattern 210 on the convex lens 410. Note that FIG. 4B shows the setup 400 forming a single optical coating on the convex lens 410 just as an example. In alternate configurations, the setup 400 repeats the formation of the optical coating on the convex lens 410 in a recursive fashion to form a composite optical coating with a plurality of optical layers. Each optical layer in the optical coating may form a portion of the first pattern 210. The composite optical coating includes one or more optical layers with the liquid crystal directors aligned to a first orientation and one or more optical layers with the liquid crystal directors aligned to a second orientation. In some configurations, each optical layer of the composite optical coating may have the liquid crystal directors aligned to a single orientation.

FIG. 5A is a setup 500 of an illumination system (e.g., the illumination system 120) for generating a portion of the second pattern 220 of FIG. 2B on a concave lens, in accordance with one or more embodiments. The setup 500 is an arrangement for illuminating a birefringent material deposited on a curved optical surface with a linear polarized light in order to form a pattern in the birefringent material on the curved optical surface. The setup 500 includes, among several other components, the polarizer 310, a focusing lens assembly 510 and a concave lens 520. Each of the focusing lens assembly 510 and the concave lens 520 is an embodiment of the optical system 140 of FIG. 1.

As shown in FIG. 5A, the focusing lens assembly 510 receives the collimated beam 315 of light from the illumination system 120 and transmits a focused beam 515 of light. The polarizer 310 receives the focused beam 515 of light from the focusing lens assembly 510. The polarizer 310 transmits a diverging polarized beam 525 toward the concave lens 520 to form the second pattern 220 on a photoalignment material deposited on the concave lens 520. In some configurations, a liquid crystal layer applied to the second pattern 220 formed on the photoalignment material deposited on the concave lens 520 includes a liquid crystal director whose orientation is determined by the second pattern 220. The setup 500 forms an optical coating on the spherically curved optical surface of the concave lens 520 by applying the liquid crystal layer on a portion of the second pattern 220 formed on the concave lens 520.

FIG. 5B is an illustration of the second pattern 220 of FIG. 2B generated on the concave lens 520, in accordance with one or more embodiments. The second pattern 220 generated on the concave lens 520 is formed by the alignment of the liquid crystal directors using a diverging beam of light passing through a linear polarizer. Unlike the first pattern 210 formed with reference to FIGS. 3A and 4A discussed above, the second pattern 220 is formed by aligning the liquid crystal directors in the photoalignment material with a diverging beam of polarized light to a target orientation by a combination of the illumination source 130, the polarizer 310, and the focusing lens assembly 510. The setup 500 forms an optical coating on the concave lens 520 by creating a portion of the second pattern 220 on the concave lens 520. Note that FIG. 5B shows the setup 500 forming a single optical coating on the concave lens 520 just as an example. In alternate configurations, the setup 500 repeats the formation of the optical coating on the concave lens 520 in a recursive fashion to form a composite optical coating with a plurality of optical layers. Each optical layer in the optical coating may form a portion of the second pattern 220. The composite optical coating includes one or more optical layers with the liquid crystal directors aligned to a first orientation and one or more optical layers with the liquid crystal directors aligned to a second orientation. In some configurations, each optical layer of the composite optical coating may have the liquid crystal directors aligned to a single orientation.

FIG. 6A is a setup 600 of an illumination system (e.g., the illumination system 120) for generating a portion of the second pattern 220 of FIG. 2B on a convex lens 620, in accordance with one or more embodiments. The setup 600 is an arrangement for illuminating a birefringent material deposited on a curved optical surface with a linear polarized light in order to form a pattern in the birefringent material on the curved optical surface. The setup 600 includes, among several other components, the polarizer 310, a focusing lens assembly 610 and a convex lens 620. Each of the focusing lens assembly 610 and the concave lens 620 is an embodiment of the optical system 140 of FIG. 1.

As shown in FIG. 6A, the focusing lens assembly 610 receives the collimated beam 315 of light from the illumination system 120 and transmits a focused beam of light. The polarizer 310 receives the focused beam of light from the focusing lens assembly 610. The polarizer 310 transmits a converging polarized beam 615 toward the convex lens 620 to form the second pattern 220 on a photoalignment material deposited on the convex lens 620. In some configurations, a liquid crystal layer applied to the second pattern 220 formed on the photoalignment material deposited on the convex lens 620 includes a liquid crystal director whose orientation is determined by the second pattern 220. The setup 600 forms an optical coating on the spherically curved optical surface of the convex lens 620 by applying the liquid crystal layer on a portion of the second pattern 220 formed on the convex lens 620.

FIG. 6B is an illustration of the second pattern 220 of FIG. 2B generated on a convex lens 620, in accordance with one or more embodiments. The second pattern 220 generated on the convex lens 620 is formed by the alignment of the liquid crystal directors using a converging beam of light passing through a linear polarizer. Unlike the first pattern 210 formed with reference to FIGS. 3A and 4A discussed above, the second pattern 220 is formed by aligning the liquid crystal directors in the photoalignment material with a converging beam of the polarized light to a target orientation by a combination of the illumination source 130, the polarizer 310, and the focusing lens assembly 610. The setup 600 forms an optical coating on the convex lens 620 by creating a portion of the second pattern 220 on the convex lens 620. Note that FIG. 6B shows the setup 600 forming a single optical coating on the convex lens 620 just as an example. In alternate configurations, the setup 600 repeats the formation of the optical coating on the convex lens 620 in a recursive fashion to form a composite optical coating with a plurality of optical layers. Each optical layer in the optical coating may form a portion of the second pattern 220. The composite optical coating includes one or more optical layers with the liquid crystal directors aligned to a first orientation and one or more optical layers with the liquid crystal directors aligned to a second orientation. In some configurations, each optical layer of the composite optical coating may have the liquid crystal directors aligned to a single orientation.

Figures 7A, 7B:
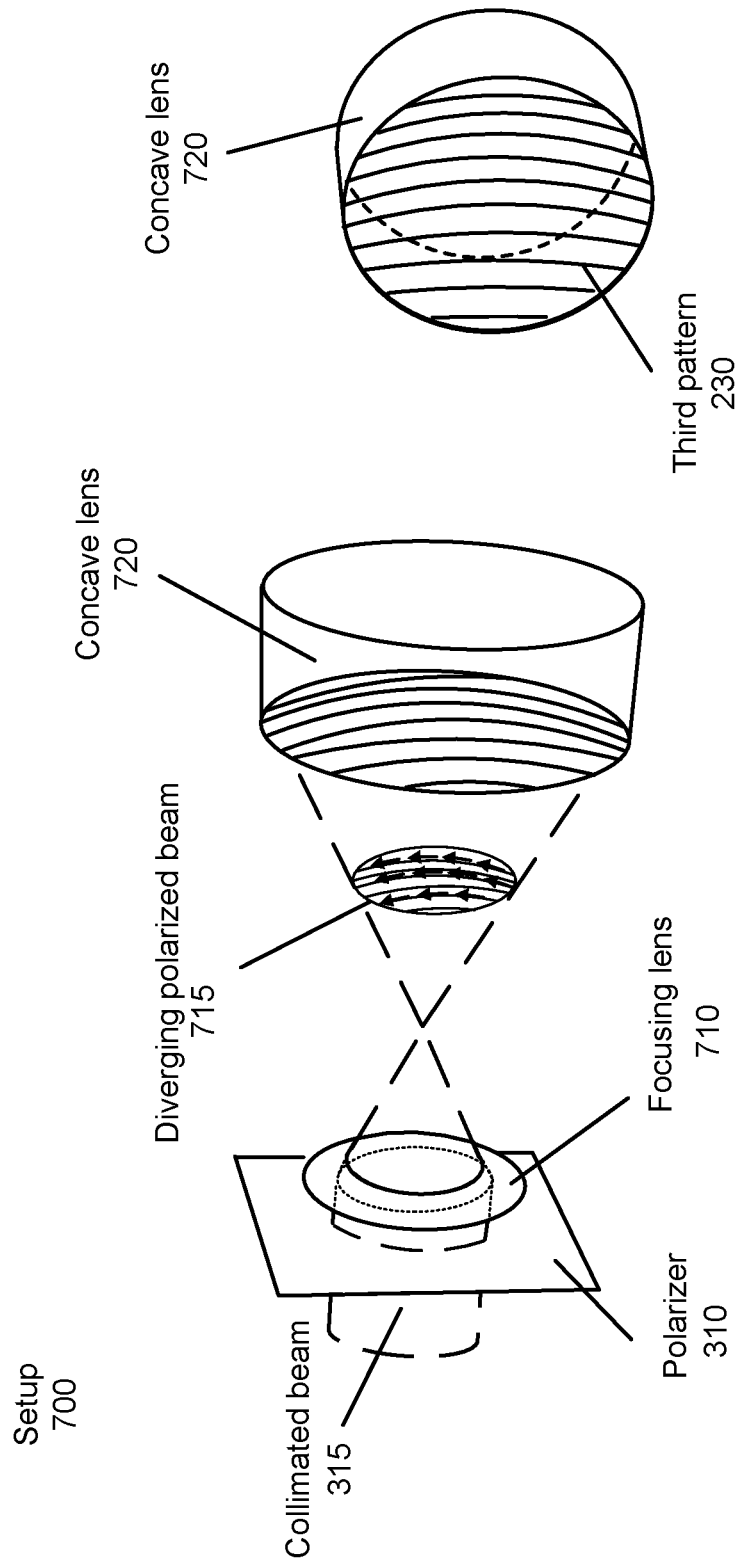
FIG. 7A is a setup of an illumination system for generating a portion of the third pattern of FIG. 2C on a concave lens, in accordance with one or more embodiments.
FIG. 7B is an illustration of the third pattern of FIG. 2C generated on a concave lens, in accordance with one or more embodiments.

FIG. 7A is a setup 700 of an illumination system (e.g., the illumination system 120) for generating a portion of the third pattern 230 of FIG. 2C on a concave lens, in accordance with one or more embodiments. The setup 700 is an arrangement for illuminating a birefringent material deposited on a curved optical surface with a linear polarized light in order to form a pattern in the birefringent material on the curved optical surface. The setup 700 includes, among several other components, the polarizer 310, a focusing lens assembly 710 and a concave lens 720. Each of the focusing lens assembly 710 and the concave lens 720 is an embodiment of the optical system 140 of FIG. 1.

As shown in FIG. 7A, the polarizer 310 receives the collimated beam 315 of light from the illumination system 120. The polarizer 310 transmits a polarized beam (not shown here) of light toward the focusing lens assembly 710. The focusing lens assembly 710 focuses the polarized light and directs a diverging polarized beam 715 toward the concave lens 720 to form the third pattern 230 on a photoalignment material deposited on the concave lens 720. In some configurations, a liquid crystal layer applied to the third pattern 230 formed on the photoalignment material deposited on the concave lens 720 includes a liquid crystal director whose orientation is determined by the third pattern 230. The setup 700 forms an optical coating on the spherically curved optical surface of the concave lens 720 by applying the liquid crystal layer on the third pattern 230 formed on the concave lens 720.

FIG. 7B is an illustration of the third pattern 230 of FIG. 2C generated on the concave lens 720, in accordance with one or more embodiments. The third pattern 230 generated on the concave lens 720 may be described as a hemispherical structure formed by the alignment of the liquid crystal directors using a polarized light exiting a focusing lens. Unlike the first pattern 210 formed with reference to FIGS. 3A and 4A discussed above, the third pattern 230 is formed by aligning the liquid crystal directors in the photoalignment material to a target orientation with a diverging beam of the polarized light exiting the focusing lens assembly 710. The setup 700 forms an optical coating on the concave lens 720 by creating a portion of the third pattern 230 on the concave lens 720. Note that FIG. 3B shows the setup 300 forming a single optical coating on the concave lens 720 just as an example. In alternate configurations, the setup 700 repeats the formation of the optical coating on the concave lens 720 in a recursive fashion to form a composite optical coating with a plurality of optical layers. Each optical layer in the optical coating may form a portion of the third pattern 230. The composite optical coating includes one or more optical layers with the liquid crystal directors aligned to a first orientation and one or more optical layers with the liquid crystal directors aligned to a second orientation. In some configurations, each optical layer of the composite optical coating may have the liquid crystal directors aligned to a single orientation.

Figures 8A, 8B:
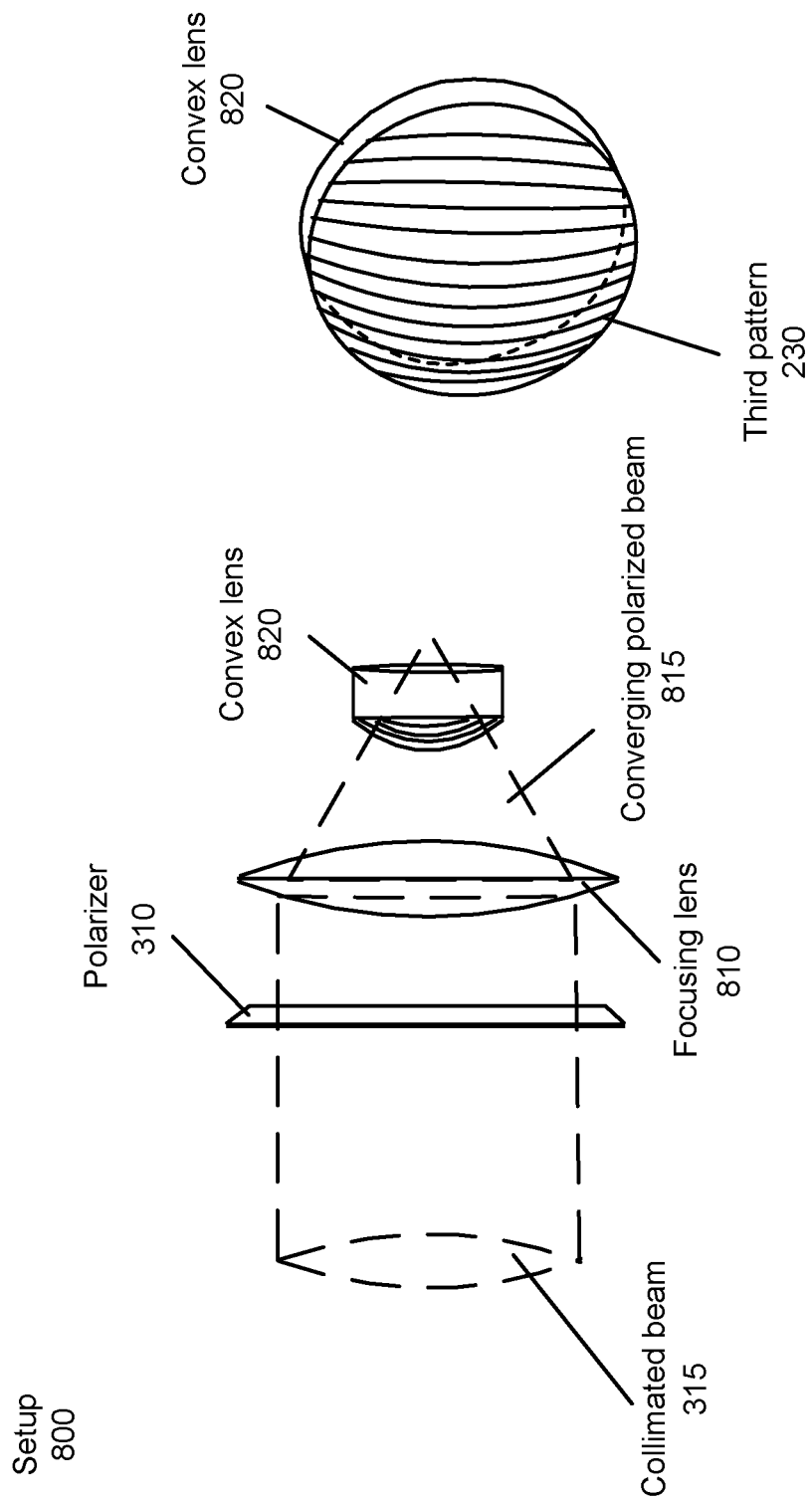
FIG. 8A is a setup of an illumination system for generating a portion of the third pattern of FIG. 2C on a convex lens, in accordance with one or more embodiments.
FIG. 8B is an illustration of the third pattern of FIG. 2C generated on a convex lens, in accordance with one or more embodiments.

FIG. 8A is a setup of an illumination system (e.g., the illumination system 120) for generating a portion of the third pattern 230 of FIG. 2C on a convex lens, in accordance with one or more embodiments. The setup 800 is an arrangement for illuminating a birefringent material deposited on a curved optical surface with a linear polarized light in order to form a pattern in the birefringent material on the curved optical surface. The setup 800 includes, among several other components, the polarizer 310, a focusing lens assembly 810 and a convex lens 820. Each of the focusing lens assembly 810 and the convex lens 820 is an embodiment of the optical system 140 of FIG. 1.

As shown in FIG. 8A, the polarizer 310 receives the collimated beam 315 of light from the illumination system 120. The polarizer 310 transmits a polarized beam (not shown here) of light toward the focusing lens assembly 810. The focusing lens assembly 810 focuses the polarized light and directs a converging polarized beam 815 of light toward the convex lens 820 to form the third pattern 230 on a photoalignment material deposited on the convex lens 820. In some configurations, a liquid crystal layer applied to the third pattern 230 formed on the photoalignment material deposited on the convex lens 820 includes a liquid crystal director whose orientation is determined by the third pattern 230. The setup 800 forms an optical coating on the spherically curved optical surface of the convex lens 820 by applying the liquid crystal layer on the third pattern 230 formed on the convex lens 820.

FIG. 8B is an illustration of the third pattern of FIG. 2C generated on the convex lens 820, in accordance with one or more embodiments. The third pattern 230 generated on the convex lens 820 may be described as a hemispherical structure formed by the alignment of the liquid crystal directors using a polarized light exiting a focusing lens. Unlike the first pattern 210 formed with reference to FIGS. 3A and 4A discussed above, the third pattern 230 is formed by aligning the liquid crystal directors in the photoalignment material to a target orientation with a converging beam of the polarized light exiting the focusing lens assembly 810. The setup 800 forms an optical coating on the convex lens 820 by creating a portion of the third pattern 230 on the convex lens 820. Note that FIG. 8B shows the setup 800 forming a single optical coating on the convex lens 820 just as an example. In alternate configurations, the setup 800 repeats the formation of the optical coating on the convex lens 820 in a recursive fashion to form a composite optical coating with a plurality of optical layers. Each optical layer in the optical coating may form a portion of the third pattern 230. The composite optical coating includes one or more optical layers with the liquid crystal directors aligned to a first orientation and one or more optical layers with the liquid crystal directors aligned to a second orientation. In some configurations, each optical layer of the composite optical coating may have the liquid crystal directors aligned to a single orientation.

Figure 9:
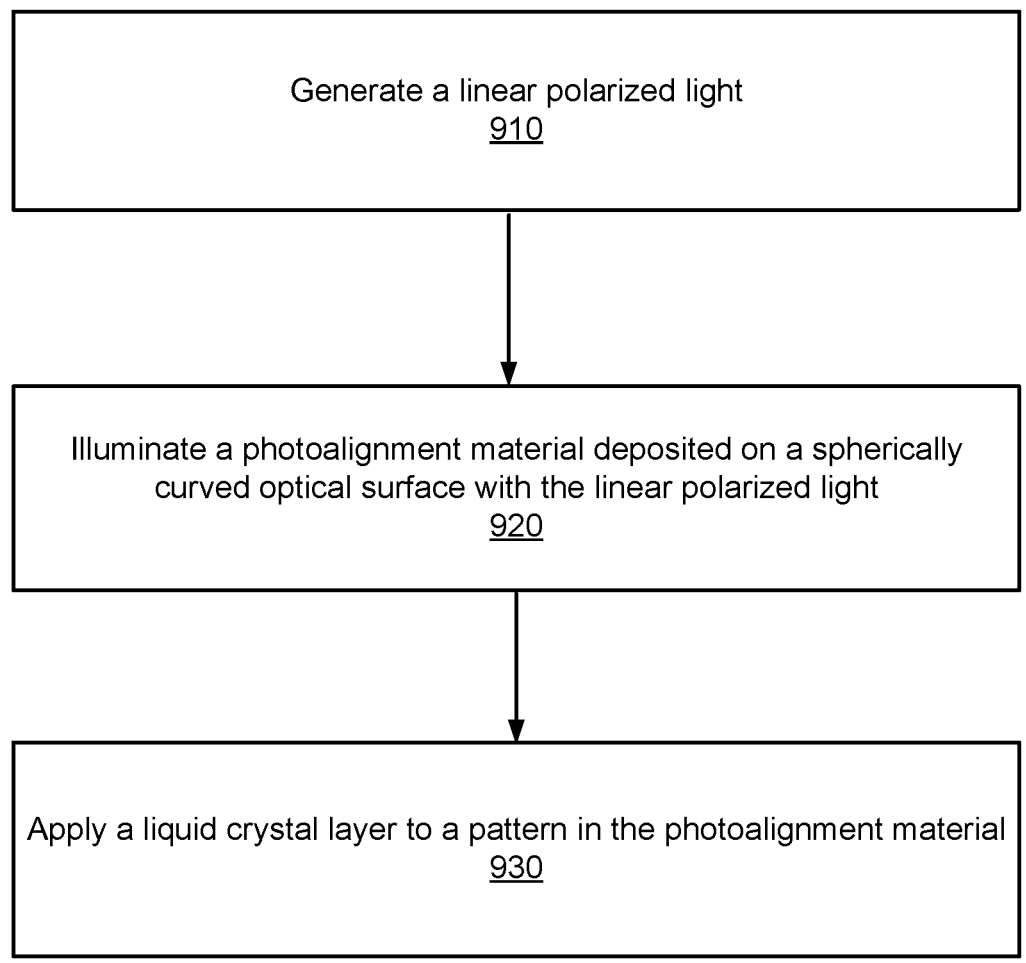
FIG. 9 is a flowchart illustrating the method for controlling an optical axis of a birefringent material using the manufacturing system of FIG. 1, in accordance with one or more embodiments.

FIG. 9 is a flowchart illustrating a method 900 for controlling an optical axis of a photoalignment material using the manufacturing system of FIG. 1, in accordance with one or more embodiments. Other entities may perform some or all of the steps of the process in other embodiments. Likewise, embodiments may include different and/or additional steps, or perform the steps in different orders. Also note that the method 900 can be used to control the optical axis of any other birefringent material (e.g. liquid crystal reactive monomers).

The manufacturing system 100 generates 910 a linear polarized light. For example, the illumination source 130 generates a beam of light within an optical band of wavelength forming a pattern on a photoalignment material deposited on a curved surface of an optical lens.

The manufacturing system 100 illuminates 920 a photoalignment material deposited by the deposition system 110 on a spherically curved optical surface with the linear polarized light. As described above in conjunction with FIG. 3A, the setup 300 illuminates 920 the photoalignment material deposited on the concave lens 320 with a linearly polarized beam of light to form the first pattern 210.

The manufacturing system 100 applies 930 a liquid crystal layer to a pattern in the photoalignment material. The pattern is a three-dimensional (e.g. x, y, and z), spatially varying optical pattern with a plurality of latitudes, a plurality of longitudes, a plurality of location and/or number of poles, and some combination thereof. The manufacturing system 100 forms an optical coating on an optical element by applying the liquid crystal layer to the pattern formed in the photoalignment material.

Note that FIG. 9 shows the manufacturing system 100 forming a single optical coating on a curved surface of an optical element just as an example. In alternate configurations, the manufacturing system 100 performs the method 900 in a recursive fashion to form a composite optical coating with a plurality of optical layers. The composite optical coating includes one or more optical layers with the liquid crystal directors in the applied liquid crystal layer aligned to a first orientation, and one or more optical layers with the liquid crystal directors in the applied liquid crystal layer aligned to a second orientation. In some configurations, each optical layer of the composite optical coating may have the liquid crystal directors aligned to a single orientation.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
generating a linear polarized light using an illumination system;
illuminating an entire surface of a photoalignment material at once with the linear polarized light, the linear polarized light forming a pattern in the photoalignment material that is deposited on a spherically curved optical surface, the pattern comprising a spatially varying optical pattern with a plurality of curved latitudes, a first pole and a second pole on the spherically curved optical surface; and
applying a liquid crystal layer to the pattern on the spherically curved optical surface to form a first optical layer, the liquid crystal layer including liquid crystal molecules oriented in one or more directions that are determined by the pattern.

2. The method of claim 1, further comprising:
generating light by an illumination light source of the illumination system; and
illuminating, by an optical assembly of the illumination system that includes an optical system and a polarizer, the photoalignment material with the linear polarized light, wherein the illumination is based on:
receiving, by the optical system, the light generated by the illumination light source, and
transmitting, by the polarizer, the linear polarized light onto the photoalignment material deposited on the spherically curved optical surface.

3. The method of claim 2, further comprising:
adjusting, by a focusing lens assembly of the optical assembly, a focal depth of the light generated by the illumination light source; and
transmitting a focused light to the polarizer that polarizes the focused light, and the polarized focused light transitions to a diverging polarized beam after a focal point of the focusing lens assembly, and the diverging polarized beam forms the pattern on the photoalignment material deposited on the spherically curved optical surface.

4. The method of claim 1, further comprising:
applying a second optical layer on top of the first optical layer to form a composite optical coating.

5. A method comprising:
depositing a photoalignment material on a spherically curved optical surface;
generating a linear polarized light using an illumination system; and
illuminating an entire surface of the photoalignment material at once with the linear polarized light, the linear polarized light forming a pattern in the photoalignment material that is deposited on the spherically curved optical surface, the pattern comprising a spatially varying optical pattern with a plurality of curved latitudes, a first pole and a second pole on the spherically curved optical surface.

6. The method of claim 5, further comprising:
generating light by an illumination light source of the illumination system; and
illuminating, by an optical assembly of the illumination system that includes an optical system and a polarizer, the photoalignment material with the linear polarized light, wherein the illumination is based on:
receiving, by the optical system, the light generated by the illumination light source, and
transmitting, by the polarizer, the linear polarized light onto the photoalignment material deposited on the curved optical surface.

7. The method of claim 6, further comprising:
adjusting, by a focusing lens assembly of the optical assembly, a focal depth of the light generated by the illumination light source; and
transmitting a focused light to the polarizer that polarizes the focused light, and the polarized focused light transitions to a diverging polarized beam after a focal point of the focusing lens assembly, and the diverging polarized beam forms the pattern on the photoalignment material deposited on the spherically curved optical surface.

* * * * *

UNITED STATES PATENT AND TRADEMARK OFFICE
CERTIFICATE OF CORRECTION

PATENT NO. : 10,712,485 B1
APPLICATION NO. : 15/892870
DATED : July 14, 2020
INVENTOR(S) : Lam et al.

Page 1 of 1

It is certified that error appears in the above-identified patent and that said Letters Patent is hereby corrected as shown below:

In the Claims

In Column 14, in Claim 6, Line 34, after "deposited on the" insert -- spherically --.

Signed and Sealed this
Twenty-fourth Day of November, 2020

Andrei Iancu
*Director of the United States Patent and Trademark Office*